3,424,721
PROCESS FOR THE PREPARATION OF
EPOXIDE RESINS
Peter Kleinschmidt, Dusseldorf-Wersten, and Manfred
Budnowski, Dusseldorf-Holthausen, Germany, assignors
to Henkel & Cie GmbH, Dusseldorf-Holthausen,
Germany
No Drawing. Filed Feb. 21, 1967, Ser. No. 617,472
Claims priority, application Germany, Mar. 26, 1966,
H 58,923
U.S. Cl. 260—47                                    11 Claims
Int. Cl. C08g 30/08, 30/10

ABSTRACT OF THE DISCLOSURE

This invention relates to a process of preparation of soft, hardenable epoxide resins based on triglycidyl isocyanurate which, when hardened, retain the desired high temperature resistant characteristics with greater flexibility than the hardened triglycidyl isocyanurate resins, as well as the soft hardenable epoxide resin produced. This process is characterized by reacting a crystallized triglycidyl isocyanurate with a content of at least 14% of epoxide-oxygen with from 1.5 to 6 mols, per 10 mols of said crystallized triglycidyl isocyanurate, of a aromatic compound selected from the group consisting of
(1) a compound having the formula

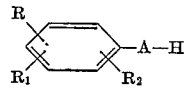

(2) a compound having the formula

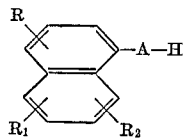

and
(3) a compound having the formula

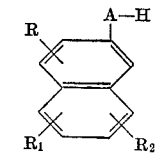

wherein R, $R_1$ and $R_2$ are members selected from the group consisting of hydrogen, alkyl having from 1 to 18 carbon atoms, halo, nitro and alkoxy having from 1 to 18 carbon atoms and A is selected from the group consisting of oxygen and sulfur, and recovering a soft, hardenable epoxide resin.

CLAIM FOR PRIORITY

Under provisions of 35 U.S.C. 119, the right of priority is hereby claimed, based on the corresponding German priority application H 58,923, filed Mar. 26, 1966.

THE PRIOR ART

It is known to prepare synthetic resins from resinous triglycidyl isocyanurate and polyhydric phenols, where the ratio of triglycidyl isocyanurate to the polyhydric, in particular to the dihydric phenols, can fluctuate within wide ranges.

In that case where corresponding proportions of dihydric phenol to triglycidyl isocyanurate are selected, soft synthetic resins containing free epoxide groups are obtained, which resins can be hardened according to the usual processes. However, the soft synethetic resins thus obtained are compounds of poor stability, which will crystallize already after a relatively short time. Furthermore, the epoxide-oxygen content of these resins continuously decreases. In addition, admixtures of these compounds with carboxylic acid anhydrides gives, when used as molding materials, a processing time which is too short for practical conditions. The hardened molded slabs exhibit a considerably lower resistance to heat deformation than those which had been prepared from the unmodified resinous triglycidyl isocyanurate, without a corresponding improvement in their mechanical and electrical properties.

OBJECTS OF THE INVENTION

An object of the invention is to prepare soft, hardenable epoxide resins based on triglycidyl isocyanurate not showing any of the disadvantages previously mentioned.

A further object of this invention is the development of a process for the production of a soft, hardenable epoxide resin based on triglycidyl isocyanurate which comprises the steps of reacting a crystallized triglycidyl isocyanurate having an epoxide-oxygen content of at least 14% with from 1.5 to 6 mols, per 10 mols of said crystallized triglycidyl isocyanurate, of an aromatic compound selected from the group consisting of (1) a compound having the formula

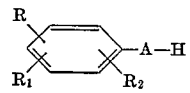

(2) a compound having the formula

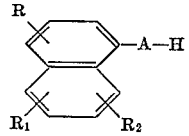

and (3) a compound having the formula

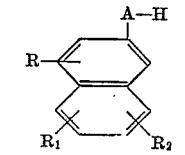

wherein R, $R_1$ and $R_2$ are members selected from the group consisting of hydrogen, alkyl having from one to eighteen carbon atoms, alkoxy having from one to eighteen carbon atoms, nitro and halo, and A is selected from the group consisting of oxygen and sulfur, at a temperature above the melting point and below the decomposition temperature of said triglycidyl isocyanurate and said aromatic compound, and recovering said soft, hardenable epoxide resin.

A yet further object of the present invention is the production of a hardened epoxide resin by the reaction of the above soft, hardenable epoxide resin and an epoxide resin hardener.

These and other objects of the invention will become more apparent as the description thereof proceeds.

DESCRIPTION OF THE INVENTION

These objectives are obtained by reacting crystallized triglycidyl isocyanurate, having an epoxide-oxygen content of at least 14%, with a monohydric aromatic hydroxide or thiol, such as phenol or thiophenol, substituted or not, where 1.5 to 6, preferably 2 to 3 mols of phenol or thiophenol are reacted with 10 mols of the triglycidyl isocyanurate.

The crystallized triglycidyl isocyanurate to be used according to the process of the invention should have an epoxide-oxygen content of at least 14%. The preparation of these crystallized triglycidyl isocyanurates is known as such and described in copending, commonly-assigned U.S. patent application S.N. 292,725, filed July 3, 1963. This preparation can be carried out by purifying crude reaction products, which are obtained, for example, by reacting cyanuric acid with an excess of epichlorohydrin. By a single or repeated recrystallization from suitable solvents such as methanol, a crystallized triglycidyl isocyanurate with the required epoxide content can be prepared.

According to the process of the invention, primarily phenol itself, or cresol isomers, or the mixtures thereof, are used as monohydric phenols. Also suitable are other alkylphenols, the alkyl chain of which containing about 2 to 18, particularly 2 to 10 carbon atoms. Suitable as such are, for example, iso-propylphenol, tert-butylphenol, hexylphenol, octylphenol, nonylphenol and others. The phenols may carry on the aromatic ring still other groups inert under the reaction conditions, as, for example, nitro groups, halide atoms, in particular chlorine atoms or bromine atoms as well as alkoxy groups, the chain length of which amounts to about 1 to 18 carbon atoms. The presence of halides on the phenols further improves the already existing flame resistance of the hardened resins based on the triglycidyl isocyanurate. Also suitable are phenols, which are derived from polynuclear aromatic compounds, particularly α- or β-naphthol or their substitution products.

As monohydric thiophenols primarily unsubstituted thiophenol is used. However, thiophenols which contain alkyl radicals with about 1 to 18 carbon atoms, in particular the isomeric methylthiophenols, are also suitable. Under the prevailing reaction conditions, the thiophenols can also contain inert groups or atoms such as, for example, chlorine or bromine atoms or nitro groups or alkoxy groups containing about 1 to 18 carbon atoms.

The phenols or thiophenols, to be used in the process of the invention, can be used individually or as a mixture.

The reaction between crystallized triglycidyl isocyanurate and phenols or thiophenols requires a duration of about ½ to 4 hours, particularly 1 to 3 hours, depending, among other factors, on the reactivity of the phenols or thiophenol employed. As a rule, shorter reaction durations are required for thiophenols than for the corresponding phenols.

In general, the reaction temperature lies above the melting point of the reactants and below the decomposition point, particularly between 110° and 150° C.

The reaction itself can be conducted in any open vessel, advantageously under stirring. Generally, as the first step, the crystallized triglycidyl isocyanurate is melted and then the phenol or thiophenol is added thereto. When the more reactive thiophenols are used, it is frequently advisable to add these to the reaction mixture in portions, whereas the phenols can be added all at once, or the mixture of crystallized triglycidyl isocyanurate and phenol can be heated to reaction temperature.

The completion of the reaction is shown by a constant epoxide-oxygen content.

The resins, obtained according to the process of the invention, are soft at room temperature and can be preserved in this condition for more than one year. Should, by way of an exception, the phenomena of crystallization become apparent, this can be eliminated by heating the resins for a short time. The resins obtained, according to the process of the invention, have epoxide equivalents of about 123 to 158, corresponding with an epoxide-oxygen content of about 13 to 10.2%. The soft, hardenable epoxide resins of the invention are soluble in organic solvents such as acetone, butanone, cyclohexanone, methylcyclohexanone, dioxane, tetrahydrofuran, dimethyl sulfoxide, toluene, xylene, ethyl acetate, butyl acetate.

These soft, hardenable epoxide resins prepared according to the process of the invention can be worked up with the usual hardeners used for epoxide resins. For example, they can be hardened with known polycarboxylic acid anhydrides or with amine hardeners, or they can be hardened under the catalytic influence of the Lewis-acids.

Hardeners which may be employed for this purpose are both the acidic and basic hardeners. Among the acidic hardeners are, for example, anhydrides of hydrocarbon di- and polycarboxylic acids preferably with 4 to 20 carbon atoms. Such compounds include, for example, the anhydrides of maleic acid, adipic acid, sebacic acid, phthalic acid, terephthalic acid, tetrahydrophthalic acid, etc. Also polymeric products, such as high molecular adipinic acid anhydride or mixtures of polymerisates of maleic acid anhydride with other polymerizable compounds can be used as hardeners. For basic hardening, organic nitrogen bases which contain primary, secondary or tertiary nitrogen atoms once, twice or several times in the molecule, and containing at least one amino radical having at least one hydrogen atom bonded to the nitrogen atom, may be used as hardners. Examples of such compounds are ethylene diamine, diethylene triamine, triethylene tetramine, piperidine, dicyandiamide, diacetoneamine, benzidine, p,p'-diamine-diphenyl methane, reaction products formed by aliphatic polyamines with dicyandiamide, and others such as versamides, i.e. polyamides which contain free amino groups.

For purposes of hardening, a mixture is formed with the soft, hardenable epoxide resin, as described, and the hardener. These types of mixtures can be utilized as molding resins or dissolved in solvents, for the purpose of impregnation or the preparation of coatings.

Since the products obtainable by the process of the invention show a good adhesion in relation to various materials, they can also be used as binding agents in admixtures with hardeners. For example, they are suitable for joining non-porous materials, such as metals, glass, porcelain and the like.

The soft, hardenable epoxide resins of the process of the invention can be admixed, by the customary methods, with dyes or fillers, for example, quartz powder, glass powder, glass fibers, asbestos fibers, mica, aluminum oxide, titanium oxide, zirconium oxide, pulverized dolomite or barium sulfate. Due to the relatively high viscosity of these soft resins, obtained according to the process of the invention, hardly any sedimentation of the added fillers is apparent.

The ratio of soft, hardenable epoxide resin to hardener depends upon the structure of the hardener which has been employed and may vary within wide limits.

The hardeners are generally used in quantities ranging from 5% to 75% by weight based upon the total weight of the mixture of epoxide resin and hardener. For each mixture of epoxide resin and any particular hardener there is a certain relatively narrow range within which optimum values can be reached. For small additions of hardeners within the range of 5-10% by weight, amines are preferably used.

When the products of the invention are worked into molding resins, it is of advantage to use polycarboxylic acid anhydrides hardening agents. The following hardeners can be considered for this purpose: hexahydrophthalic acid anhydride tetrahydrophthalic acid anhydride, phthalic acid anhydride, methylcyclohexanedicarboxylic acid anhydride, dodecenylsuccinic acid anhydride, pyromellitic acid anhydride, endomethylenetetrahydrophthalic acid anhydride, methylendomethylenetetrahydrophthalic acid anhydride and others.

The amount of the polycarboxylic acid anhydride to be used shall be measured so that 0.6 to 1.2, preferably 0.8 to 0.9 carboxylic acid anhydride groups, are allotted to each epoxide group in the soft, hardenable epoxide resin.

In contrast to the non-modified, powdery triglycidyl isocyanurate, the thus obtainable molding mixtures can be worked up already at a temperature of 60° C. At this temperature they will retain a low viscosity for a long period of time. It is to be noted as a particular advantage, that the molded slabs, prepared in this fashion, exhibit greatly improved mechanical properties with constant electrical values and with a hardly perceptible drop in the Martens temperature, in contrast to the epoxide resins, modified with polyhydric phenols according to the state of the prior art.

The following examples will serve for better comprehension on the invention, however, it is to be understood, that they will not limit the invention in any manner.

EXAMPLE I (a) 150 gm. of crystallized trigylcidyl isocyanurate (epoxide-oxygen content, 15.2% technical mixture of low and high melting forms) were introduced into a three-necked flask of 500 ml. capacity equipped with thermometer and stirrer, and the mixture was heated to 120° C. by means of a heating mantle. Then, dropwise and under stirring, 11 gm. of thiophenol were added to the melted triglycidyl isocyanurate within the space of ½ hour. The temperature was maintained at 120° C. and, after the addition of the thiophenol, the stirring was continued for 2 hours longer at the same temperature.

In this manner, a soft, hardenable epoxide resin was obtained with an epoxide-oxygen content of 13.0%, corresponding with an epoxide equivalent of 123.

(b) The procedure described above was repeated, however, with the difference that instead of 11 gm. of thiophenol, 16.5 gm. of thiophenol were added, dropwise, within the space of ½ hour. In this case too, a soft, hardenable epoxide resin was obtained, which had an epoxide-oxygen content of 12.4%, corresponding with an epoxide equivalent of 129.

EXAMPLE II (a) 150 gm. of crystallized triglycidyl isocyanurate (epoxide-oxygen content, 15.2%, a technical mixture from the low and high melting forms) were heated in the apparatus described in Example I, to a temperature of 135° to 140° C. While stirring 9.5 gm. of phenol were added to the melt in one portion. Next, the mixture was stirred for a further 2 hours at a temperature of 135° to 140° C. A soft, hardenable epoxide resin was obtained which had an epoxide-oxygen content of 12.4%, corresponding with an epoxide equivalent of 129.

(b) The procedure, described above, was repeated, but with the difference that instead of 9.5 gm., 14.3 gm. of phenol were used. Again a soft, hardenable epoxide resin was obtained with an epoxide-oxygen content of 11.7%, corresponding with an epoxide equivalent of 137.

EXAMPLE III

In a three-necked flask of 500 ml. capacity, 150 gm. of crystallized triglycidyl isocyanurate were melted at a temperature of 135° to 140° C., and, while stirring, 22 gm. of nonylphenol were added. After a further 2 hours of stirring at the same temperature, the mixture was allowed to cool. An epoxide resin, which was soft at room temperature, was obtained, having an epoxide equivalent of 133, corresponding with an epoxide-oxygen content of 12%.

EXAMPLE IV

The process for the preparation of the soft, hardenable epoxide resin, as described in the preceding example, was repeated, but in the place of nonylphenol, 12.9 gm. of p-chlorophenol were used. Again a soft, hardenable epoxide resin was obtained, having an epoxide equivalent of 128, corresponding with an epoxide-oxygen content of 12.5%.

EXAMPLE V

The preparation of the epoxide resin as described in Example III was repeated, but in the place of nonylphenol, 12.4 gm. of the monomethyl ether of pyrocatechol were used. A soft, hardenable eposide resin was obtained with an epoxide equivalent of 132, corresponding with an epoxide-oxygen content of 12.1%.

EXAMPLE VI

Hardening of the soft, hardenable epoxide resins prepared according to the invention.

The soft, hardenable epoxide resins, prepared as described in the preceding, could be worked into molding mixtures by means of the usual hardeners used for epoxide resins at a temperature of 60° to 130° C.

The resin-hardener mixture was processed at a temperature of 60° to 100° C. At this temperature the molded resin slabs were allowed to gelatinize, then they were hardened over a period of 3 hours at 160° C. and tempered for 20 hours at 200° C.

In the following table the first column indicates the number of the example, according to which the soft, hardenable epoxide resin was prepared, then follows the amount of the resin as well as the quantity and type of the polycarboxylic acid anhydride used. The subsequent columns show the resistance to deformation by heat (DIN 53 458), the impact strength (DIN 53 453), the deflection and the flexural strength (DIN 53 458). The surface leakage of current amounted in all of the cases to KA3c (DIN 53 480).

TABLE

| Example | Epoxide Resin, g. | Hardener* | Martens, Temp., °C. | Impact Strength, cm.-kg./cm.² | Deflection, mm. | Flexural Strength, kg./cm.² |
|---|---|---|---|---|---|---|
| 1a | 161 | 198 g. MHHPA | 203 | 11 | 5 | 760 |
| 1a | 161 | 188 g. HHPA | 209 | 17 | 6 | 810 |
| 2a | 160 | 200 g. MHHPA | 208 | 17 | 6 | 930 |
| 2a | 160 | 175 g. HHPA | 201 | 17 | 7 | 890 |
| 3 | 172 | 147 g. HHPA | 173 | 19 | 4 | 530 |
| 4 | 163 | 168 g. HHPA | 178 | 17 | 5 | 840 |
| 5 | 162 | 155 g. HHPA | 170 | 13 | 5 | 820 |

*MHHPA=methylhexahydrophthalic acid anhydride.
HHPA=hexahydrophthalic acid anhydride.

The preceding specific embodiments are illustrative of the invention. It is to be understood, however, that other expedients known to those skilled in the art may be employed without departing from the spirit of the invention or the scope of the appended claims.

We claim:

1. A process for the production of a soft, hardenable epoxide resin based on triglycidyl isocyanurate which comprises the steps of reacting a crystallized triglycidyl isocyanurate having an epoxide-oxygen content of at least 14% with from 1.5 to 6 mols, per 10 mols of said crystallized triglycidyl isocyanurate, of an aromatic compound selected from the group consisting of (1) a compound having the formula

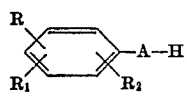

(2) a compound having the formula

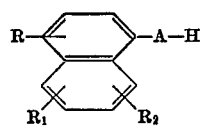

and (3) a compound having the formula

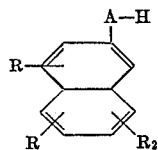

wherein R, $R_1$ and $R_2$ are members selected from the group consisting of hydrogen, alkyl having from one to eighteen carbon atoms, alkoxy having from one to eighteen carbon atoms, nitro and halo, and A is selected from the group consisting of oxygen and sulfur, at a temperature above the melting point and below the decomposition temperature of said triglycidyl isocyanurate and said aromatic compound, and recovering said soft, hardenable epoxide resin.

2. The process of claim 1 wherein from 2 to 3 mols, per 10 mols of said crystallized triglycidyl isocyanurate, of said aromatic compound is utilized.

3. The process of claim 1 wherein said reaction is conducted at a temperature between 110° C. and 150° C.

4. The process of claim 1 wherein said aromatic compound is thiophenol.

5. The process of claim 1 wherein said aromatic compound is phenol.

6. The process of claim 1 wherein said aromatic compound is nonylphenol.

7. The process of claim 1 wherein said aromatic compound is p-chlorophenol.

8. The process of claim 1 wherein said aromatic compound is the monomethyl ether of pyrocatechol.

9. The soft, hardenable epoxide resin produced by the process of claim 1.

10. A hardenable epoxide resin composition which comprises the soft, hardenable epoxide resin produced by the process of claim 1, in combination with an epoxide resin curing agent selected from the group consisting of acidic and basic curing agents.

11. A hardened epoxide resin produced by hardening the soft, hardenable epoxide resin produced by the process of claim 1, with an epoxide resin curing agent selected from the group consisting of acidic and basic curing agents.

References Cited

UNITED STATES PATENTS 2,908,664    10/1959    Belanger et al.

WILLIAM H. SHORT, *Primary Examiner.*

T. D. KERWIN, *Assistant Examiner.*

U.S. Cl. X.R.

161—186, 185, 184; 260—836, 79, 37, 33.6, 32.8, 31.2, 30.8, 30.4, 18